(12) United States Patent
Carter

(10) Patent No.: US 12,310,295 B2
(45) Date of Patent: May 27, 2025

(54) VINE TRELLIS

(71) Applicant: NZ Tube Mills Limited, Wellington (NZ)

(72) Inventor: Terry Carter, Wellington (NZ)

(*) Notice: Subject to any disclaimer, the term of this patent is extended or adjusted under 35 U.S.C. 154(b) by 0 days.

(21) Appl. No.: 17/898,396

(22) Filed: Aug. 29, 2022

(65) Prior Publication Data

US 2024/0065183 A1 Feb. 29, 2024

(51) Int. Cl.
*A01G 17/06* (2006.01)

(52) U.S. Cl.
CPC ................ *A01G 17/06* (2013.01)

(58) Field of Classification Search
CPC .......... A01G 17/06; A01G 9/12; A01G 17/02; A01G 22/05; A01G 17/04
USPC ............................................. 47/46
See application file for complete search history.

(56) References Cited

U.S. PATENT DOCUMENTS

| | | | | |
|---|---|---|---|---|
| 23,338 | A * | 3/1859 | Aylesworth | A01G 17/06 185/37 |
| 3,337,988 | A * | 8/1967 | Burton | A01G 17/06 248/219.4 |
| 5,711,109 | A * | 1/1998 | Pitts | A01G 17/02 47/46 |
| 9,357,716 | B1 * | 6/2016 | Takeda | A01G 17/06 |
| 9,717,189 | B2 * | 8/2017 | Sowinski | A01G 17/02 |
| 2004/0026678 | A1 * | 2/2004 | Vandergriff | A01G 17/06 256/47 |
| 2012/0000124 | A1 * | 1/2012 | Posa | A01G 9/12 47/45 |
| 2013/0118069 | A1 * | 5/2013 | Hunt | A01G 17/14 47/46 |
| 2016/0165814 | A1 * | 6/2016 | Parrish | A01G 17/06 47/46 |

FOREIGN PATENT DOCUMENTS

CA 2197151 A1 * 2/1997

* cited by examiner

*Primary Examiner* — Brady W Frazier
*Assistant Examiner* — Zoe Tam Tran
(74) *Attorney, Agent, or Firm* — Douglas J. Ryder; Ryder, Mazzeo & Konieczny LLC

(57) ABSTRACT

Grape vines may grow on a trellis comprising a series of wires supported by a line of posts, but it is difficult to machine-prune vines after harvest without interference from wires. A trellis having primary posts and secondary posts may support vines in a manner that cane growing from vine's cordons can be readily removed. Between each neighing pair of primary posts there are at least two secondary posts. A cordon wire runs along and is supported by the posts at or adjacent to top. Cordons of vines are connected to, and grow along, wire such that most foliage and grapes forming part of vines grow below wire. Wire is held by posts above ground level in a manner to be non-destructively pulled upwards to free it from posts. This may occur after cordons have been severed from rest of vine and may then be readily stripped from wire.

21 Claims, 4 Drawing Sheets

VINE TRELLIS

FIELD OF INVENTION

This invention relates to a vine trellis, for example for supporting grape vines as they grow.

BACKGROUND

It is known to train grape vines to grow on a trellis comprising a series of wires supported by a line of posts. However, a problem with many known arrangements is that a large number of heavy and therefore relatively expensive posts are used, and it is difficult to machine-prune the vines after harvest without interference from the wires. A further problem is that the cordons of grape vines can become undesirably 'woody' over time and cause the vine to be less than optimally productive. The inventors have identified that to address this it is desirable to sever the cordons periodically to allow new cordons to shoot on the vine. However, attempting to do this for vines growing on at least some known styles of trellis can be less than efficient.

OBJECT

It is an object of preferred embodiments of the invention to go at least some way towards addressing the above problems in a manner that assists to enhance the longevity of vines. While this applies to preferred embodiments, the object of the invention per se is simply to provide a useful choice. Therefore, any objects or advantages applicable to preferred embodiments should not be taken as a limitation on claims expressed more broadly.

Definitions

The term "comprises" or "has", if and when used in this document in relation to one or more features, should not be seen as excluding the option of there being additional unmentioned features. The same applies to derivative terms such as "comprising" and "having".

SUMMARY OF THE INVENTION

According to one aspect, the invention is a trellis supporting a plurality of growing vines, comprising:
a plurality of metallic primary posts each having a transverse cross section of 63 mm (or 2.5 inches)±30%; and
a plurality of metallic secondary posts each having a transverse cross section of 11 mm (or 0.4 inches)±50%;
The trellis being such that:
the primary and secondary posts extend from the ground in a line such that between each neighing pair of the primary posts there are at least two of the secondary posts;
a cordon thread runs along and is supported by the primary and secondary posts at or adjacent to the top of these;
cordons of the vines are connected to, and extend along, the cordon thread generally in the longitudinal direction of the thread, and such that at least most foliage and grapes forming part of the vines have grown below the thread; and
the cordon thread is held by the primary and secondary posts in such a manner that it can be non-destructively pulled upwards to free it from the posts at least when the vines have seasonally substantially shed their foliage.

Optionally the cordon thread comprises a line of wire.
Optionally there are two of the secondary posts between at least some neighbouring pairs of the primary posts.
Optionally there are three of the secondary posts between at least some neighbouring pairs of the primary posts.
Optionally there are four of the secondary posts between at least some neighbouring pairs of the primary posts.
Optionally there are five of the secondary posts between at least some neighbouring pairs of the primary posts.
Optionally there are six of the secondary posts between at least some neighbouring pairs of the primary posts.
Optionally the cordons are supported and grow on the cordon thread and are not grown on any other cordon supporting thread running along the line of posts.
Optionally the primary posts are substantially circular in transverse cross section for substantially their entire length.
Optionally the cordon thread is under tension such that it does not sag between the primary and secondary posts.
Optionally the primary posts are 63 mm (or 2.5 inches) wide±15% and the secondary posts are 11 mm (or 0.4 inches) wide±30%.
Optionally the primary posts are 63 mm (or 2.5 inches) wide±10% and the secondary posts are 11 mm (or 0.4 inches) wide±20%.
Optionally the primary and secondary posts are spaced from their immediately neighbouring secondary post(s) by 1,525 mm (or 5 feet)±25%.
Optionally the primary and secondary posts are spaced from their immediately neighbouring secondary post(s) by 1,525 mm (or 5 feet)±15%.
Optionally the primary and secondary posts are spaced from their immediately neighbouring secondary post(s) by 1,525 mm (or 5 feet)±10%.
Optionally the primary and secondary posts are spaced from their immediately neighbouring secondary post(s) by 1,525 mm (or 5 feet)±5%.
In a further aspect, the invention is a method of growing grapes comprising the steps of:
arranging a trellis as noted above;
after grapes have been harvested from the vines:
severing the vines below their respective cordons;
lifting the cordon thread clear of the primary and secondary posts with the cordons attached to the cordon thread;
stripping the cordons from the cordon thread;
securing the wire to at least the primary posts such that it is supported by the primary and secondary posts; and
allowing new cordons to shoot from the vines and training them to grow along the cordon thread such that new growth canes, foliage and grapes of the vines grow predominantly below the cordon thread.
Optionally for the method the severing of the cordons occurs after every $4^{th}$, $5^{th}$, or $6^{th}$ growing cycle of the respective vines (e.g., every $4^{th}$, $5^{th}$ or $6^{th}$ year or every $4^{th}$, $5^{th}$ or $6^{th}$ autumn or winter season).

DRAWINGS

Some preferred embodiments of the invention will now be described by way of example and with reference to the accompanying drawings, of which:
FIG. 1 illustrates a trellis that is supporting grape vines in a vineyard;
FIG. 2 illustrates posts forming part of the trellis;

DETAILED DESCRIPTION

Figure 1:
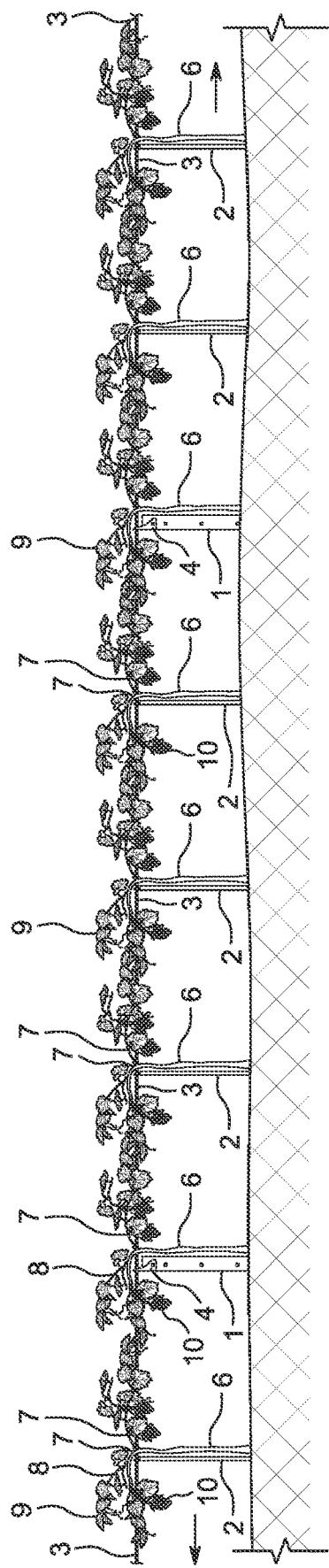

Referring to FIG. 1, the trellis comprises a series of primary posts 1 and secondary posts 2. These are arranged in a more or less straight line such that between each immediately neighbouring pair of the primary posts 1 there are three of the secondary posts 2. As shown, the arrangement is a repeating pattern of grids, each grid being: primary post—secondary post—secondary post—secondary post—primary post.

While it is preferred to have three secondary posts 2 between each pair of neighbouring primary posts 1, in other embodiments there may be more or fewer. For example, there may be one, two, four, five or six secondary posts 2 between each neighbouring pair of primary posts 1.

Desirably the primary and secondary posts are substantially formed of galvanised steel or some other suitable metallic material. Each primary post is preferably 63 mm (or 2.5 inches, or $2^{31}/_{64}$ inches) wide±25% and each secondary post is desirably 11 mm (or 0.4 inches, or $7/_{16}$ inch) wide±50%. Preferably the primary posts are at least mainly formed from hollow pipe with a substantially consistent circular transverse cross section.

In some embodiments each primary post is 63 mm (or 2.5 inches, or $2^{31}/_{64}$ inches) wide±15% and each secondary post is 11 mm (or 0.4 inches or $7/_{16}$ inch) wide±30%.

In other embodiments each primary post is 63 mm (or 2.5 inches, or $2^{31}/_{64}$ inches) wide±10% and each secondary post is 11 mm (or 0.4 inches, or $7/_{16}$ inch) wide±20%.

Preferably the primary and secondary posts are spaced from their immediately neighbouring secondary post(s) by 1,525 mm (or 5 feet)±25%, ±15%, ±10% or ±5%.

A cordon thread, for example a wire 3, is run along the top part of each primary post 1 and secondary post 2 to hold it under tension. Preferably the wire is tensioned to such a degree that has no, or insubstantial, sag between all of the posts 1, 2.

In some embodiments the cordon thread may be in the form of two wires running in parallel in close proximity, for example touching or with only an insignificant distance between them laterally and/or vertically. Ideally, if the wires are spaced, it is to such an immaterial degree that for all intents and purposes they function in the trellis in the same way as one cordon wire.

Figure 2:
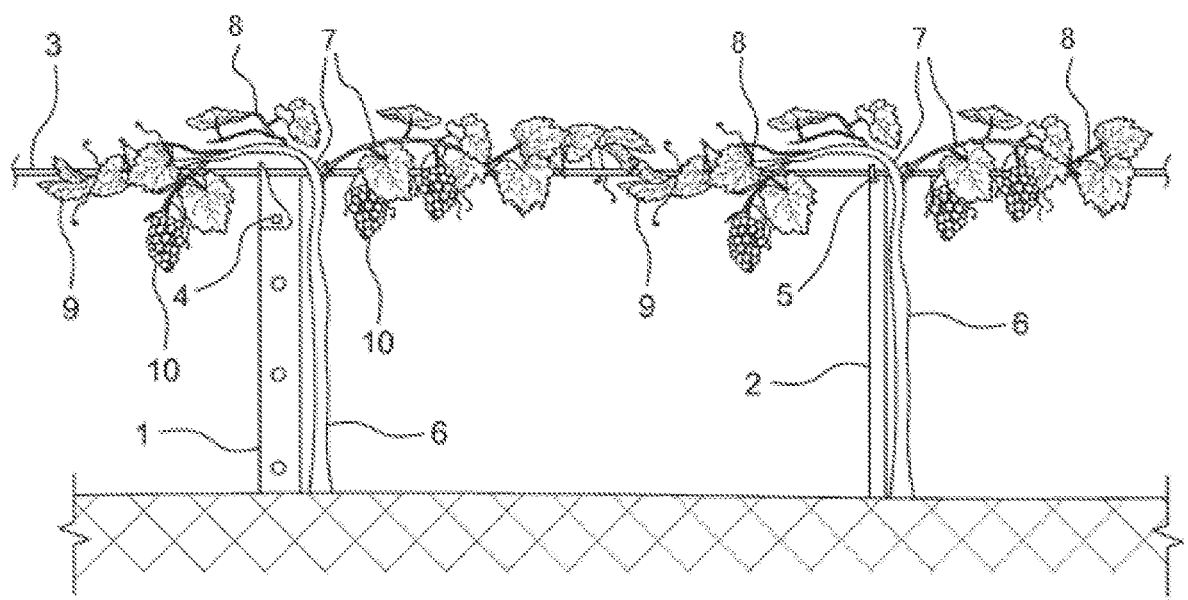

Referring to FIG. 2, the wire 3 is located in and grasped by a retainer clip 4 on the top of each primary post 1. The arrangement is such that the wire can only be pulled free of the clip 4 by a substantial deliberate upward force. As also shown, the top part of each secondary post 2 has a retainer lug 5 which holds the wire 3 to restrain it against movement sideways or down. However, in each case the lug does not grasp the wire. In other words, the wire can be pulled upwards to release it without resistance from the lugs 5.

As shown in FIGS. 1 and 2, each post supports a growing grape vine 6. In each case the cordons 7, canes 8 and foliage 9 of the vine grow along and are supported by the wire 3 (the canes 8 are in the nature of narrow branches that grow from the cordons 7). Because the cordons 7 and canes 8 grow generally horizontally, the foliage 9 tends to grow, as a result of gravity, at least predominantly below the wire. The result is that the foliage provides a degree of sun protection to grapes 10 as they grow.

At various times in the growing cycle of the vine, a box cutter machine as known in the art is run along the row of posts to trim the canes 8 and remove excess foliage. The cutter is basically an arrangement of four circular blades, one positioned either side of the foliage, one above it and one below it. As it runs along the vines, it cuts the canes 8 and foliage 9 into a box shape. The blade below the foliage automatically swings out of the way each time it gets neat one of the posts, and then moves back when the post has been passed.

After harvest and after the foliage has dropped from the vines near to winter, all that is left of the vines on the wire are the cordons 7 and canes 8. Over time, for example a few years' worth of growing seasons, the cordons 7 become thickened to the extent that the vines become too woody and insufficiently productive. To address this the vines should be pruned to allow for new cordons to develop in the next growing season. When the new cordons form, new canes and foliage will shoot off them.

Figure 3:
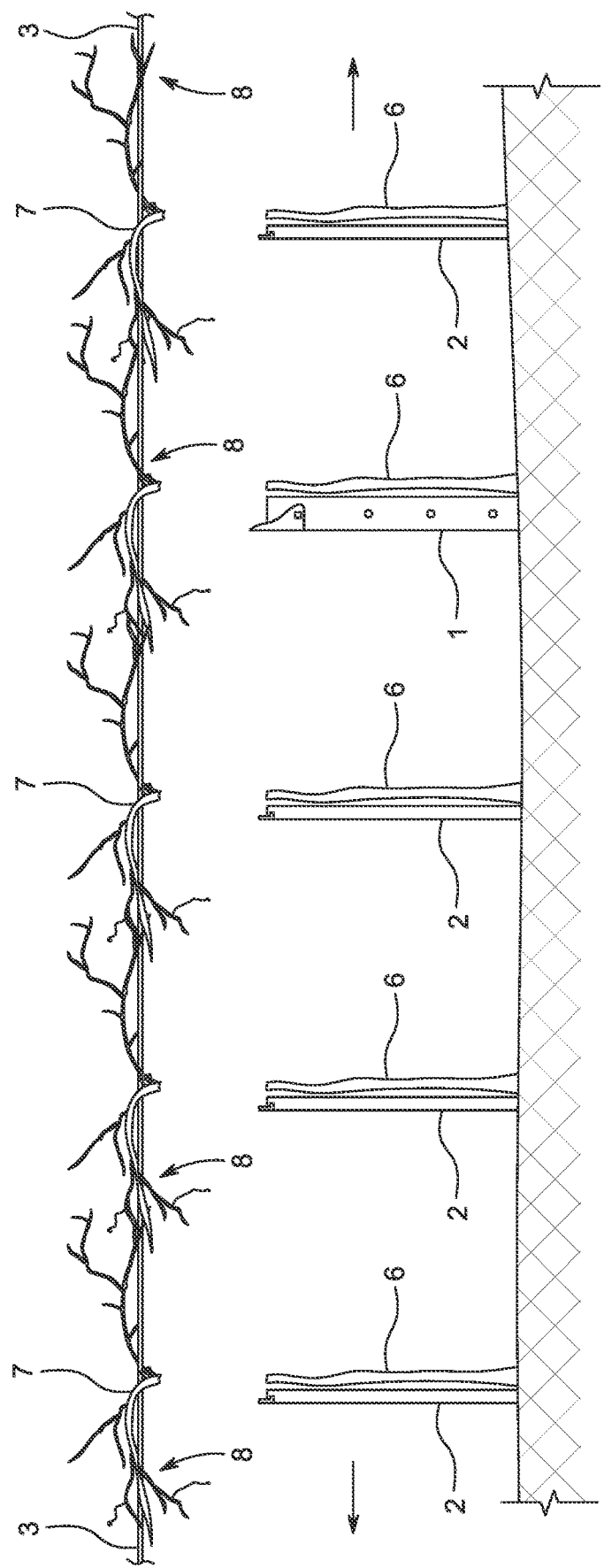
FIG. 3 illustrates the trellis during pruning of the vines.

Referring to FIG. 3, to facilitate pruning, the vines are severed just below the cordons 7, and the wire 3 is pulled upwards free of the primary and secondary posts 1, 2 still attached to the cordons 7 and canes 8. There is preferably no foliage on the vines, and no grapes, as this occurs after harvest, for example in mid to late autumn or in winter. A trimer machine is then run along the wire to strip it clean of the cordons 7 and canes 8.

Figure 4:
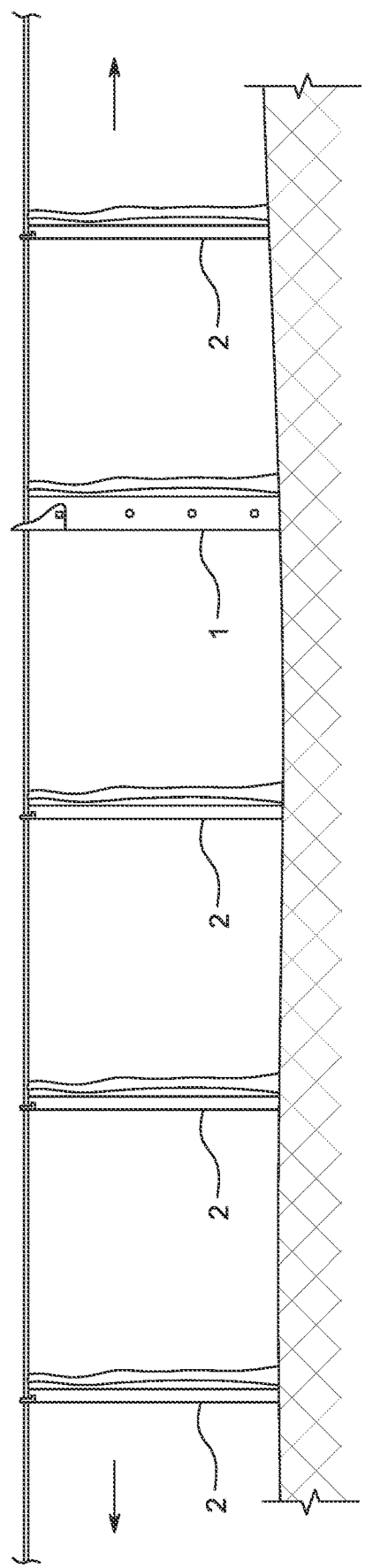
FIG. 4 illustrates the trellis after pruning.

Referring to FIG. 4, when the wire 3 has been stripped clean of the cordons and foliage it is re-engaged with the posts 1, 2, ready to support new-growth cordons and their associated new cane and foliage in the next growing season. This pruning preferably takes place each 4, 5 or 6 years so that the vines are healthier and more productive in terms of grape output. The process in a sense rejuvenates the vines and gives them a longer production life that would otherwise apply. The process may for example be done to 20% of a vineyard annually to allow production to be kept up for the rest of vineyard, in case it takes more than one growing season for the cordons to properly rejuvenate.

Preferably substantially all the vines along the row of posts 1, 2 substantially grow about at or below the level of the line of wire 3. The arrangement is different to a situation where vines are trained so their cordons, canes and foliage grow upward while supported by two or more vertically spaced parallel wires, which are in turn supported by a series of consistently thick high posts.

While some forms of the invention have been described by way of example, it should be appreciated that modifications and improvements can be made without departing from the scope of the following claims.

In terms of disclosure, this document envisages and hereby posits any feature mentioned herein in combination with itself or any other feature or features mentioned herein, even if the combination is not claimed.

The invention claimed is:

1. A trellis configured to support a plurality of growing vines, comprising:
   a plurality of metallic primary posts each having a transverse cross section of 63 mm (or 2.5 inches)±30%; and
   a plurality of metallic secondary posts each having a transverse cross section of 11 mm (or 0.4 inches)±50%;
   wherein:
   the primary and secondary posts extend from the ground in a line so that between each neighbouring pair of the primary posts there are at least two of the secondary posts;

a cordon wire runs along and is supported by the primary and secondary posts at or adjacent to a top thereof, the cordon wire is configured to have cordons of the vines that are connected to, and extend along, the cordon wire generally in the longitudinal direction of the cordon wire, and such that at least most foliage and grapes forming part of the vines have grown below the cordon wire; and the cordon wire is held by the primary and secondary posts in such a manner that the cordon wire can be non-destructively pulled upwards to free it from the primary and secondary posts without requiring any changes to the primary and secondary posts, wherein the cordon wire can be freed from the primary and secondary posts at least when the vines have seasonally substantially shed their foliage.

2. The trellis according to claim 1, wherein the cordon wire is tensioned.

3. The trellis according to claim 2, wherein there are two of the secondary posts between at least some neighbouring pairs of the primary posts.

4. The trellis according to claim 2, wherein there are three of the secondary posts between at least some neighbouring pairs of the primary posts.

5. The trellis according to claim 2, wherein there are four of the secondary posts between at least some neighbouring pairs of the primary posts.

6. The trellis according to claim 2, wherein there are five of the secondary posts between at least some neighbouring pairs of the primary posts.

7. The trellis according to claim 2, wherein there are six of the secondary posts between at least some neighbouring pairs of the primary posts.

8. The trellis according to claim 1, wherein the cordons are supported and grow on the cordon wire supported by the primary and secondary posts, wherein if the trellis includes any other cordon supporting wire running along the line of the primary and secondary posts the cordons are not supported or grown thereon.

9. The trellis according to claim 8, wherein the primary posts are substantially circular in transverse cross section for substantially their entire length.

10. The trellis according to claim 1, wherein the cordon wire is under tension such that the cordon wire does not sag between the primary and secondary posts.

11. The trellis according to claim 2, wherein the primary posts are 63 mm (or 2.5 inches) wide±15% and the secondary posts are 11 mm (or 0.4 inches) wide±30%.

12. The trellis according to claim 2, wherein the primary posts are 63 mm (or 2.5 inches) wide #10% and the secondary posts are 11 mm (or 0.4 inches) wide±20%.

13. The trellis according to claim 2, wherein the primary and secondary posts are spaced from their immediately neighbouring secondary post(s) by 1,525 mm (or 5 feet) ±25%.

14. The trellis according to claim 1, wherein the primary and secondary posts are spaced from their immediately neighbouring secondary post(s) by 1,525 mm (or 5 feet) ±15%.

15. The trellis according to claim 1, wherein the primary and secondary posts are spaced from their immediately neighbouring secondary post(s) by 1,525 mm (or 5 feet) ±10%.

16. The trellis according to claim 1, wherein the primary and secondary posts are spaced from their immediately neighbouring secondary post(s) by 1,525 mm (or 5 feet) ±5%.

17. The trellis according to claim 1, wherein:

there are two or more of the secondary posts between at least some neighbouring pairs of the primary posts;

the cordons are supported by and grow on the cordon wire supported by the primary and secondary posts, wherein if the trellis includes any other cordon supporting wire running along the line of the primary and secondary posts the cordons are not supported or grown thereon;

the cordon wire is under tension such that the cordon wire does not sag between the primary and secondary posts; and the primary and secondary posts are spaced from their immediately neighbouring secondary post(s) by 1,525 mm (or 5 feet)+25%.

18. A method of growing grapes comprising the steps of:

arranging a trellis according to claim 1; and after grapes have been harvested from the cordon of the vines:

severing the vines below their respective cordons;

lifting the cordon wire clear of the primary and secondary posts with the cordons attached to the cordon wire;

stripping the cordons from the cordon wire;

securing the cordon wire to at least the primary posts such that the cordon wire is supported by the primary and secondary posts; and allowing new cordons to shoot from the vines and training them to grow along the cordon wire such that new growth canes, foliage and grapes of the vines grow predominantly below the cordon wire.

19. The method according to claim 18, wherein the severing of the vines below their respective cordons occurs after every 4th, 5th, or 6th growing cycle of the respective vines.

20. The method according to claim 19, wherein the severing of the vines below their respective cordons occurs after every 5th growing cycle of the respective vines.

21. A trellis configured to support a plurality of growing vines, comprising:

a plurality of primary posts each having a retainer clip at, or adjacent to, a top thereof;

a plurality of secondary posts each having a retainer lug at, or adjacent to, a top thereof, wherein the primary and secondary posts extend from the ground in a line so that between each neighbouring pair of the primary posts there are at least two of the secondary posts; and a cordon wire that runs along the line of the primary posts and the secondary posts, wherein the cordon wire is secured to each primary post by the retainer clip and is supported by each secondary post by the retainer lug, wherein the cordon wire is configured to have cordons of the vines that are connected to, and extend along, the cordon wire generally in the longitudinal direction of the cordon wire, and such that at least most foliage and grapes forming part of the vines have grown below the cordon wire, and when desired such as when the vines have seasonally substantially shed their foliage, non-destructively pulling upwards on the cordon wire to free the cordon wire from the retainer clips of the primary posts and the retainer lugs of the secondary posts without any modification to the retainer clips or the retainer lugs.

* * * * *